July 2, 1946.  D. B. BAKER ET AL  2,403,326
BEARING LUBRICATION
Filed June 26, 1944  2 Sheets-Sheet 2

Inventors:
David B. Baker
and William O. Beckman
By Paul O. Pippel
Atty.

Patented July 2, 1946

2,403,326

UNITED STATES PATENT OFFICE 2,403,326

BEARING LUBRICATION

David B. Baker, Riverside, and William O. Bechman, Chicago, Ill., assignors to International Harvester Company, a corporation of New Jersey Application June 26, 1944, Serial No. 542,144

4 Claims. (Cl. 192—110)

This invention has to do with a clutch and more particularly concerns a dry friction clutch employing a lubricated bearing between hubs of its drive and driven parts and a clutch mounting providing for the lubrication of said bearing without discharging lubricant onto the clutch friction elements.

The clutch and the mounting therefor herein shown for illustrating the invention are especially adapted for use in a final drive power train for an endless track of a crawler tractor. A final drive arrangement of this general charactre is fully disclosed in U. S. Patent No. 2,197,-289 to D. B. Baker at al., and environment for the present showing is illustrated in concurrently filed application Serial No. 542,145, filed June 26, 1944. Also it should be noted that said application Serial No. 542,145 and other concurrently filed applications, Serial Nos. 542,142 and 542,143 all assigned to the assignee of this application, contain claims directed to subject matter herein shown but not herein claimed.

Final drive clutches for crawler tractors are conventionally used for steering as well as for transmitting driving force to the endless tracks, the steering being accomplished by selectively declutching the driving connections to the tracks so the direction of the vehicle can be changed by driving the track at only a selected side thereof through the clutch which is left engaged. When both clutches are engaged and both tracks are driven, the vehicle follows a straight course. This use of the clutches demands frequent disengagement and reengagement and because of the great mass of the vehicles themselves, in addition to the immense loads which they customarily propel, it is essential that the clutches be large to transmit the required power and to dissipate the correspondingly large amount of heat. Despite the size of the clutches, a hoist being required to support them during removal or replacement, they require periodic servicing. To facilitate this servicing the clutch and the parts thereabout herein disclosed are designed and arranged so the clutch can be detached from driving and driven shafts, between which it is used for establishing a driving connection, and thereafter removed bodily from the tractor without the detachment of additional parts.

An important object of this invention is the provision in a clutch of the aforesaid character of an antifriction bearing unit between its relatively rotatable driving and driven members to retain the clutch in assembly during its installation upon and removal from the tractor.

Another object is the provision of a clutch according to the preceding object, together with means in a shaft from which the clutch is detachable for supplying lubricant to the clutch bearing, and of an oil seal in the clutch on the opposite side of said bearing from said shaft to prevent spreading of the lubricant to the clutch friction surfaces.

These and other desirable objects inherent in and encompassed by the invention will be better understood after reading the following description with reference to the accompanying two sheets of drawings, wherein.

Figure 1:
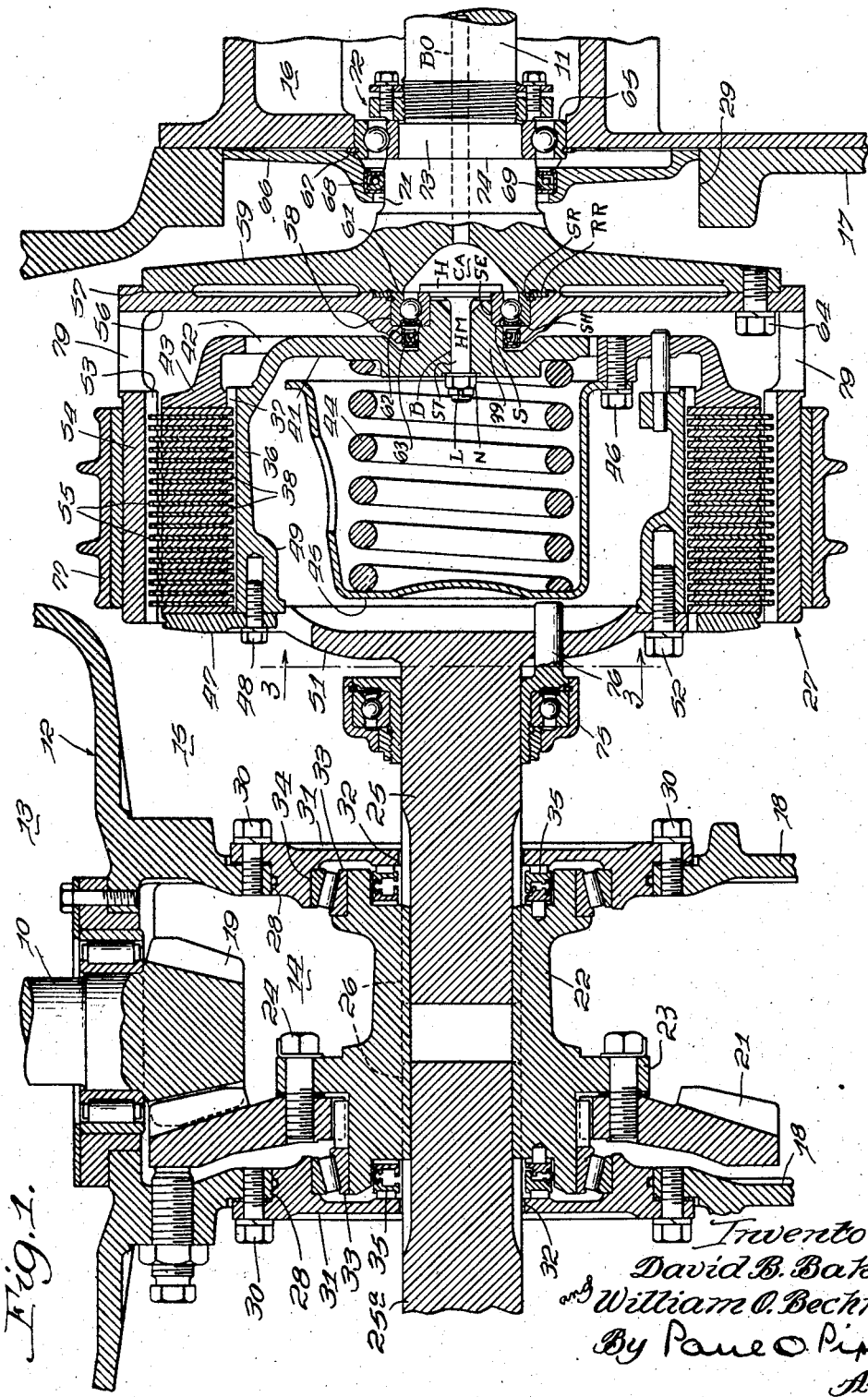
Fig. 1 is a horizontal sectional view taken through the rear portion of the body or frame housing of a crawler tractor, showing a center gear compartment, a clutch compartment, and a portion of a final drive compartment.

With continued reference to the drawings, there is shown therein a preferred embodiment of the invention as applied to a steering clutch and mounting therefor in the rear body portion of a crawler tractor. Said tractor rear body portion 12, which may be considered as a tractor frame and also as a housing for a power transmission mechanism for interruptively driving the endless tracks on opposite sides of the tractor, is shown only sufficiently to disclose the relation of such power transmission apparatus to a power input shaft 10 and a power output shaft 11. The invention which relates to only a portion of the clutch and the journaled support therefor will be more fully comprehended following a clear understanding of the entire apparatus disclosed in the drawings.

Said frame housing 12, or rear body portion of the tractor, includes a change speed transmission gear compartment 13, wherein gearing (not shown) determines the speed and direction that the input shaft 10 is driven with respect to the vehicle engine. There is also provided in the frame housing 12 a gear compartment 14, clutch compartments 15 on opposite sides of said gear compartment and final drive compartments 16 (only one being shown) outwardly of the clutch compartments 15. A tail wall 17 separates each of the compartments 15 from its associated final drive housing 16, and a head wall 18 separates the gear compartment 14 from each of the clutch compartments 15.

Power from the input shaft 10 is transmitted through a pinion gear 19 formed integrally therewith to a bevel gear 21 and thence to a tubular driving member 22, having a flange 23 to which the gear 21 is secured by bolts 24. At the driving member 22, the power may be divided and transmitted in opposite directions through shafts 25 and 25ª, each of which is splined internally to the tubular driving member 22 as indicated at 26. From the shaft 25, the power is transmitted through a steering clutch 27 to the output shaft 11 when said clutch is closed. Additional gearing (not shown) in the lubricant-containing compartment 16 is utilized for further speed reduction before the power is applied to a driving sprocket for the endless track of the tractor. A similar arrangement (not shown) is employed between the shaft 25ª and an endless track at the opposite side of the tractor.

Each of the compartment separating walls 18 contains a large opening 28 which is accurately centered with openings 29 in the walls 17 of which but one is shown. Openings 28 carry and center bearing supporting plates 31. Each plate 31, secured to its wall 18 by cap-screws 30, contains an opening 32 for accommodating and which is slightly oversize with respect to the shaft 25 or 25ª. Roller bearing units 33 are carried upon shoulders 34 in the plates 31 for rotatably supporting the tubular driving member 22 coaxially with the openings 28 in the compartment separating walls. The bearing units 33 are lubricated by lubricant contained within the gear compartment 14 and some of this lubricant passes between the rollers of such units, but is prevented from leaking into the clutch compartments 15 by annular oil seal devices 35 of any conventional structure. These oil seal devices 35, therefore, cooperate with the tubular driving member 22 in preventing the leakage of the lubricant from the gear compartment 14 outwardly of this compartment through the wall plate openings 32.

Figure 3:
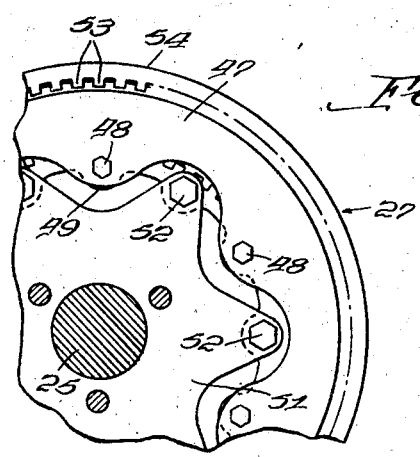
Fig. 3 is a sectional view taken on the line 3—3 of Fig. 2.

The clutch 27, which may be removed from the housing 15 as a unit, is thoroughly described in the aforesaid application, Serial No. 542,143, so that a brief description thereof here will suffice. The driving part of said clutch includes an inner drum 36 on which there are formed exterior axially extending ribs 37 which fit into notches (not shown) within the inner peripheries of a series of friction drive disks 38. A hub 39 for the drum 36 is connected therewith by spoke-like radiating portions 41, the space between the radiating portions 41 accommodating radiating portions 42 of a pressure plate 43. A coiled spring 44 which tends to maintain the clutch engaged reacts between a portion of the hub 39 and the left end of a spring cup 45 of which the base is connected to the pressure plate 43 by cap-screws 46. A reaction plate 47 at the left end of the friction rings is secured to the left end of the driving drum 36 by a plurality of circumferentially spaced cap-screws 48 which are anchored in radially inwardly projecting bosses 49 on said drum 36. Alternate of the circumferentially spaced bosses 49 are secured to an enlarged flanged end 51 of the shaft 25 by cap-screws 52. This is clearly illustrated in Fig. 3.

Axial circumferentially spaced ribs 53, on an outer drum 54 of the clutch, are received in notches (not shown) in the outer periphery of friction driven disk rings 55. The driven drum 54 has an end wall 56 at its outer or right end which contains coaxial seats 57 and 58 respectively for the outer periphery of flange 59 on the clutch-driven shaft 11 and for a ball bearing unit 61 which pilots the hub 39 of the clutch driving member in said end wall 56.

This ball bearing unit 61 together with fastening means therefor presently to be described, which serve to retain the drive and driven parts of the clutch in assembly when it is bodily extracted from the compartment 15, constitute an element of this invention. Dis-assembly of the outer race of the bearing unit 61 from the position shown, where it abuts a shoulder SH at one end of the seat 58, is prevented by a snap ring SR disposed within a groove of the outer periphery of said race and which snap ring is abutted by a retaining ring RR when the driven drum end wall 56 is attached to the driven shaft flange 59. A headed member HM retains the inner race of the ball bearing unit 61 against the shoulder S of a seat SE on the hub 39 by abutting its head H against the right end of such race and by the projection of a stem portion ST through a bore B in said portion for the screwing thereonto of a nut N and a locking means L therefor. This disposition in the attaching of the ball bearing unit 61 in permanent assembly with the clutch adapts the bearing unit to be lubricated by lubricant subjected thereto through a cavity CA in the end of the driven shaft 11 and supplied to such cavity through a shaft bore BO. Leakage of the lubricant beyond the bearing unit 61 to the left through the end wall opening 62 is prevented by an annular oil seal device 63. The aforesaid attachment of the drum end wall 56 to the flange 59 on the inner or left end of the shaft 11 is accomplished by means of cap-screws 64 distributed circumferentially about said end wall and turned into suitable holes near the edge of said flange. Proper centering of the clutch and shaft 11 is provided for by the precise fitting of the flange 59 into the end wall seat 57.

A ball bearing unit 65 for journaling the driven shaft 11 has its outer race centered with respect to the compartment wall opening 29 by a centering plate 66 fitted into such opening and having a shoulder 67 for said bearing unit. A second shoulder 68 in the centering plate receives an oil seal device 69 which acts with the driven shaft in preventing leakage of lubricant from the final drive compartment 16 into the lubricant-free compartment 15, through the oversize shaft-receiving opening 71 in said centering plate. A standard means 72 is employed for holding the iner race of the ball bearing unit 65 upon a shaft section 73 and against a shaft shoulder 74.

Normally, as explained hereinabove, the large coiled spring 44 in the clutch maintains the clutch engaged while acting against the hub of the driving drum 36 and pressing the spring cup 45 to the left together with the pressure plate 43, whereby the alternately arranged driving and driven friction rings 38 and 55 are pressed together in stacked relation against a reaction plate 47 secured to the left end of the driving drum. Thus rotative force from the clutch driving shaft 25 is transmitted from the driving drum 36 through the plates 38 and 55 to the driven drum 54 and thence through the driven shaft flange 59 to said driven shaft. Release of the clutch is effected by manual movement of a throwout bearing unit 75, to the left of the clutch, to the right whereby stems 76 are pressed against the spring retaining cup 45 to force it, and the pressure plate 43 to the right incident to compressing the spring.

In braking the vehicle, brake bands 77 of any conventional structure may be applied to the outer periphery of the clutch driven drums 54, and also the brake bands may be applied to the clutch drums 54 selectively to obtain or facilitate steering of the vehicle in the conventional manner.

Figure 2:
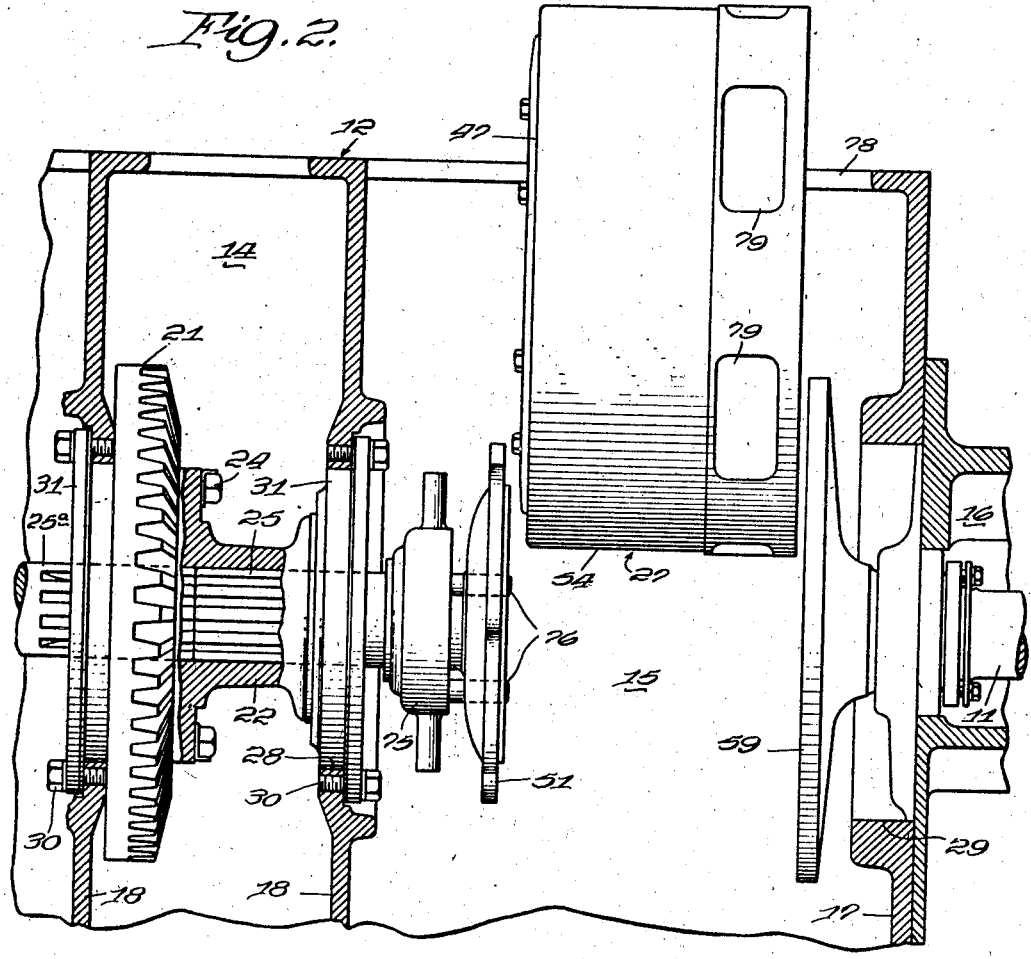
Fig. 2 is a vertical sectional view of the apparatus shown in Fig. 1, but with the clutch viewed in elevation and illustrated in a partly removed position.

When it is desired to remove one of the clutches 27 to service the same as by the replacement of the friction rings 38 and 55, the mechanic will gain access to the heads of the cap-screws 52 and 64 through a casing opening 78 of Fig. 2 and unscrew these cap-screws respectively from the left end of the clutch driving drum 36 and from the plate 59 on the left end of the clutch driven shaft 11. Openings 79 (Figs. 1 and 2) are provided in the clutch driven drum 54 in radial registry with the cap-screws 64 so that the heads of the cap-screws are accessible to a wrench. Subsequent to the removal of the cap-screws 52 and 68, and the attachment of a hoist to the clutch 27, the shaft 25 will be forced to the left, as viewed in Fig. 2, into abutment with the right end of the shaft 25ª so as to provide clearance between the driving and driven shaft flanges or plates 51 and 59, as illustrated in Fig. 2, so that the clutch can be lifted bodily and unitarily from its compartment 15. During these manipulations of the clutch 27, the oil seal device 69 will prevent the leakage of lubricant from the final drive compartment 16 into the lubricant-free clutch compartment 15 and the sealing devices 35 at opposite ends of the tubular driving member 22 together with such tubular member will prevent leakage of lubricant from the gear compartment 14 into the clutch compartments. A similar procedure is followed for removing the clutch 27 (not shown) in the left clutch compartment 15, but, of course, in that procedure the shaft 25ª will be moved to the right to abut against the shaft 25 for providing the necessary clearance which facilitates removal of the clutch.

Having thus described a preferred embodiment of the invention with the view of clearly illustrating the same, we claim:

1. In a clutch and mounting therefor, a lubricant-free casing compartment, drive and driven dry clutch members in said casing and which are relatively rotatable when the clutch is released and having concentric hubs, a shaft journaled in said casing coaxially with said clutch members, said shaft having an end drivingly and supportingly connected with one of the clutch members and having a lubricant cavity in such end, means for maintaining a coaxial relative rotational relation between the other of said clutch members and said shaft comprising a bearing unit disposed between said hubs and including inner and outer races respectively thereon, said shaft end cavity being communicative with said bearing unit to direct lubricant thereto, and an annular sealing device disposed between said hubs on the opposite side of the bearing unit from the shaft end cavity to cooperate with said hubs in confining the lubricant to said cavity and bearing unit.

2. In a clutch and mounting therefor, a casing, drive and driven clutch members in said casing and which are relatively rotatable when the clutch is released and having concentric hubs, a shaft journaled in said casing coaxially with said clutch members and having a detachable driving connection at an end with one of said members, means including said one clutch member and its said detachable connection for maintaining a coaxial relative rotational relation between the other of said clutch members and said shaft and for preventing relative axial movement of such other member and said shaft comprising a bearing unit disposed between said hubs and including inner and outer races respectively axially fixed to said hubs, and lubrication supply means for said bearing unit comprising a lubricant conducting passage in said shaft and communicating with said end theerof.

3. In a clutch installable between drive and driven shafts in spaced end to end relation for transmitting power therebetween, and of which shafts one has a lubricant supplying cavity in its end; the combination of drive and driven clutch members for respective driving connection with said shafts, said clutch members being relatively rotatable when the clutch is released and having respective inner and outer hubs arranged concentrically, the inner of said hubs having an axial bore communicating between its ends and an outer periphery seat with a shoulder spaced from and facing toward an end of said hubs, the outer hub having an inner periphery seat opposed to the first seat and a shoulder spaced from and facing the corresponding end of the outer hub, a bearing unit disposed between the hubs and comprising inner and outer races respectively in said outer and inner seats and against said shoulders to limit axial movement of the bearing unit inwardly from said hub ends, the side of said bearing unit facing in the same direction as said hub ends being exposed to said lubricant supplying cavity, a retaining member having a head engaging the inner bearing unit race and having a shank extending through said inner hub bore for the accommodation of fastening means at the other end of the hub for drawing said head firmly against the inner bearing unit race to prevent retraction thereof from its associated hub seat, and an annular sealing device also disposed between said hubs on the opposite side of the bearing unit from said hub ends.

4. In a clutch detachably connectible as a unit in a power transmitting connection between drive and driven shafts in spaced end to end relation and of which shafts one thereof has a lubricant supplying cavity in its end and an attaching flange projecting radially from such end, coaxial drive and driven clutch members for respective attachment with said shafts and having concentric hubs having ends disposed toward and coaxially with said flanged shaft, a bearing unit assembled concentrically with and in journaled relation between said hubs, an annular oil seal structure between said hubs on the opposite side of said bearing unit from said hub ends, means on the clutch member that attaches to the flanged shaft for covering said cavity while facilitating the discharge of lubricant therefrom into said bearing unit, and attaching means for unitary connection of the clutch with said flanged shaft and comprising means for detachably connecting the last mentioned clutch member with said flange and accessible for manipulation for effecting or terminating said connection while the clutch members remain assembled with said bearing.

DAVID B. BAKER.
WILLIAM O. BECHMAN.